Sept. 27, 1960     Y. SEKELLA     2,954,184

ROTARY BOBBIN HOLDER

Filed June 13, 1958

WITNESS:
Esther M. Stockton

INVENTOR.
Youston Sekella
BY Clinton S. James
ATTORNEY

United States Patent Office 2,954,184
Patented Sept. 27, 1960

2,954,184

ROTARY BOBBIN HOLDER

Youston Sekella, Elmira, N.Y., assignor to The Bendix Corporation, a corporation of Delaware Filed June 13, 1958, Ser. No. 741,874

4 Claims. (Cl. 242—130.2)

The present invention relates to rotary bobbin holders, and more particularly to pendulous rotary supports for bobbins in spinning frames and the like.

It is an object of the present invention to provide a novel bobbin holder which holds the bobbin securely but is released quickly and easily.

It is another object to provide such a device which is adaptable for use in bobbins having various sizes of openings. It is another object to provide such a device which is simple and economical in construction, and efficient and durable in operation.

Further objects and advantages will be apparent from the following description taken in connection with the accompanying drawing in which.

Figure 1:
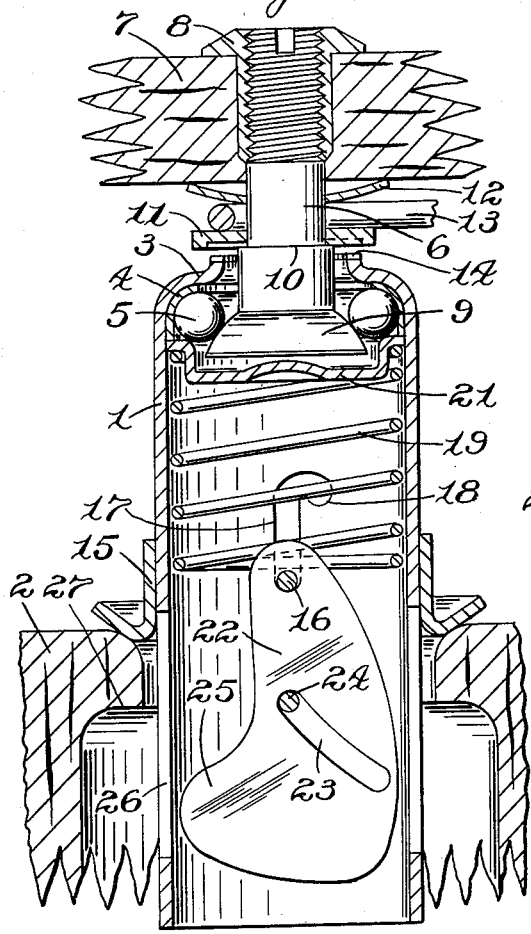
Fig. 1 is a vertical substantially mid-sectional view of a preferred embodiment of the invention showing the parts in normal position prior to the attachment of the bobbin.

In Fig. 1 of the drawing there is illustrated a generally cylindrical tubular body 1 adapted to enter loosely in the upper end of a bobbin, a portion of which is illustrated at 2. The upper end of body 1 is constricted as shown at 3 in order to form a seat for a bearing cup 4 in which a plurality of bearing balls 5 are seated. A supporting bolt 6 is retained in an opening in a creel board 7 by means of a sleeve nut 8 and at its lower end is formed with a spherical bearing surface 9 cooperating with the balls 5 to form a swivel bearing for the bobbin holder with allowance for some universal movement.

The supporting bolt 6 is formed with a shoulder 10, and a stationary toothed clutch member 11 is firmly clamped between said shoulder and a spring thrust washer 12 threaded on the supporting bolt below the creel board 7. A bar brake member 13 such as shown in the patent to Mann 2,109,543 issued March 1, 1938, is preferably interposed between the thrust washer and the clutch member 11. The upper end of the body 1 is formed with teeth 14 adapted to cooperate with the teeth of clutch member 11 and prevent rotation of the bobbin holder when it is raised to cause engagement of said teeth.

A tapered centering collar 15 is slidably mounted on the body 1 of the bobbin holder and has a pin 16 fixedly mounted at its ends therein and diametrically traversing the body 1 through a pair of axially extending slots 17 in said body. The upper ends of the slots 17 are curved laterally to form seats 18 receiving pin 16 when the collar 15 and pin 16 are rotated slightly while held in their upper positions. A spring 19 is located in the body 1 bearing at its lower end on the pin 16 and at its upper end bearing against a dished washer 21 which is seated against the bearing cup 4.

Figure 2:
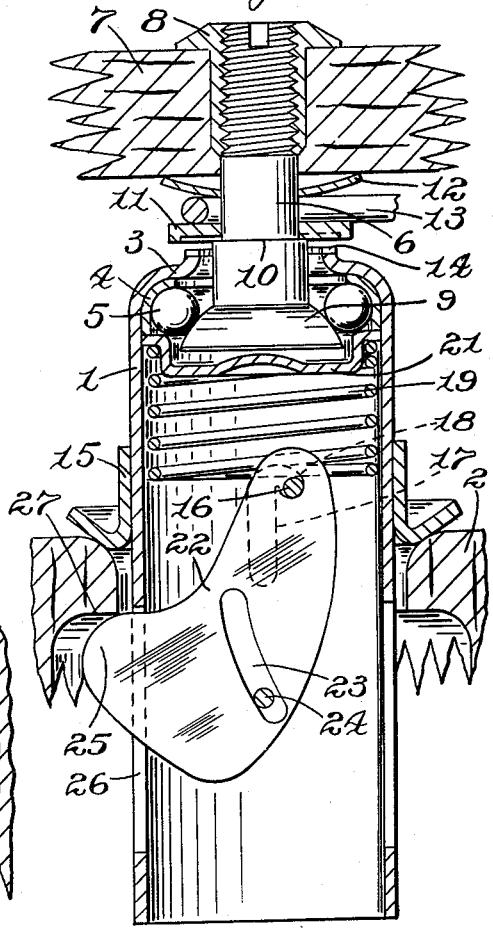
Fig. 2 is a similar view showing the positions of the parts when the bobbin is mounted on the holder.
Figure 3:
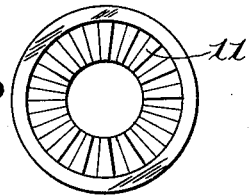
Fig. 3 is a detail of the clutch member used to prevent rotation of the bobbin holder during the latching and unlatching operation of the device.

A curved latch member 22 is pivoted at its upper end on the pin 16 and is provided with an arcuate slot 23 slidably engaging a pin 24 fixed in any suitable manner in the body 1 of the bobbin holder. The latch is formed at its lower end with a curved extension 25 which is arranged to project through a slot 26 in the body 1 of the bobbin holder and thereby engage an internal shoulder 27 in the bobbin as shown in Fig. 2. The curvature of the slot 23 in the latch 22 is such that when the latch is raised by the upward movement of the pin 16 on which it is pivoted, the stationary pin 24 causes the latch to swing outwardly into its operative position.

In the operation of the device, starting with the parts in the positions illustrated in Fig. 1, in order to mount a bobbin 2 on the holder it is pushed up on said body, until it engages the collar 15 and then thrust upwardly against the force of the spring 19 until the collar moves the pin 16 to the upper end of the slots 17. Further upward movement of the bobbin and collar then raises the body 1 of the bobbin holder until the teeth 14 on the upper end of the bobbin holder are firmly pressed against the teeth of the stationary clutch member 11, thereby preventing rotation of the bobbin holder. The bobbin 2 is then rotated slightly to bring the pin 16 into the seats 18 at the upper ends of the slots 17 so that when the bobbin is released by the operator, the collar 15 and pin 16 are held in their upper positions as shown in Fig. 2.

As previously indicated, the upward movement of the pin 16 causes the latch 22 to swing outwardly through the slot 26 whereby the projecting portion 25 of the latch engages the shoulder 27 in the interior of the bobbin and holds the bobbin securely.

When it is desired to remove the bobbin it is merely necessary to again thrust it upwardly to raise the pin 16 out of the seats 18 and close the clutch 14, 11. A slight reverse twist of the bobbin then rotates the collar 15 and pin 16 to bring said pin into alinement with the slots 17 in the body of the bobbin holder whereupon the collar 15, pin 16 and latch 22 are permitted to return to their idle positions, releasing the bobbin.

The friction between the upper end of the bobbin 2 and the tapered portion of the collar 15 will be found normally adequate to insure rotation of the collar with the bobbin during the locking and unlocking operation of the latch. If desired, however, the tapered portion of the collar may be knurled or toothed, in order to increase the coefficient of coupling between said members.

Figure 4:
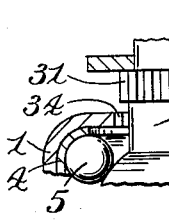
Fig. 4 is a detail of a modified form of clutching arrangement.

In Fig. 4 of the drawing there is illustrated a modified form of clutching arrangement for the body of the bobbin holder. As there shown, the clutch member 11 is omitted. Clutch teeth 31 are formed directly on the supporting bolt 36 to cooperate with similar teeth 34 on the end of the body member when the latter is raised as above described. This arrangement has the advantage that less upward pressure is required to prevent rotation of the bobbin holder body than might be required in the first embodiment of the invention.

Although certain structure has been shown and described in detail it will be understood that changes can be made in the form and arrangements of the parts without departing from the spirit of the invention.

I claim:

1. In a pendulous bobbin holder a tubular body adapted to enter a hollow bobbin, bearing means for rotatably supporting said body, a collar slidably mounted on said body, a pin in said collar traversing the body, said body having axial slots in which said pin is slidable, the upper ends of said slots having curved portions which are offset laterally and downwardly to provide seats for the pin, a latch member in the body pendulously supported on the pin and having an inclined slot, a second pin fixed in the body traversing said inclined slot, said body having an axial slot adjacent the latch, the slot in the latch being so formed that when the latch is raised by the collar to its upper position with its supporting pin in said seats, the lower end of the latch projects through the adjacent slot in the body to form a support for a bobbin on said body.

2. A bobbin holder as set forth in claim 1 including further yielding means urging the collar and latch assembly toward the lower end of the body.

3. A bobbin holder as set forth in claim 1 including further a clutch means operative by raising the body of the holder from its bearing to resist rotation of said body.

4. A bobbin holder as set forth in claim 1, including further a stationary toothed clutch member spaced slightly above the body of the holder, the upper end of said body being provided with clutch teeth engageable with the teeth of said fixed clutch member by upward movement of said body.

References Cited in the file of this patent

UNITED STATES PATENTS 2,836,376   Winslow _____ May 27, 1958